United States Patent
Bering et al.

(10) Patent No.: US 7,322,193 B2
(45) Date of Patent: Jan. 29, 2008

(54) EXHAUST GAS RECIRCULATION SYSTEM

(75) Inventors: Christopher Adam Bering, Waterloo, IA (US); Richard Edward Winsor, Waterloo, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 11/207,309

(22) Filed: Aug. 19, 2005

(65) Prior Publication Data

US 2007/0039322 A1 Feb. 22, 2007

(51) Int. Cl.
*F02B 33/44* (2006.01)
*F02M 25/07* (2006.01)
*F01N 3/10* (2006.01)

(52) U.S. Cl. ............................... 60/605.2; 123/568.11; 60/303

(58) Field of Classification Search ............... 60/605.2, 60/274, 278, 280; 123/568.11; F02M 25/07
See application file for complete search history.

(56) References Cited

U.S. PATENT DOCUMENTS

| 4,094,284 | A | * | 6/1978 | Gesell | 123/568.11 |
| 6,003,315 | A | | 12/1999 | Bailey | 60/605.2 |
| 6,038,860 | A | | 3/2000 | Bailey | 60/605.2 |
| 6,205,775 | B1 | * | 3/2001 | Coleman et al. | 60/278 |
| 6,216,458 | B1 | | 4/2001 | Alger et al. | 60/605.2 |
| 6,453,893 | B1 | * | 9/2002 | Coleman et al. | 60/274 |
| 6,543,428 | B1 | * | 4/2003 | Blandino et al. | 60/274 |
| 6,609,374 | B2 | * | 8/2003 | Feucht et al. | 60/602 |
| 7,013,879 | B2 | * | 3/2006 | Brookshire et al. | 123/568.12 |
| 7,036,482 | B2 | * | 5/2006 | Beck et al. | 123/229 |
| 7,131,271 | B2 | * | 11/2006 | Bulicz et al. | 60/605.2 |
| 2006/0021327 | A1 | * | 2/2006 | Kiser et al. | 60/278 |
| 2006/0179824 | A1 | * | 8/2006 | Roser | 60/303 |

FOREIGN PATENT DOCUMENTS

| EP | 869 275 | 2/1998 |
| JP | 10 176611 | 6/1998 |

* cited by examiner

*Primary Examiner*—Thai-Ba Trieu

(57) ABSTRACT

An exhaust gas recirculation (EGR) system is provided for an internal combustion engine having a combustion air intake circuit, an exhaust manifold, and an exhaust circuit for communicating engine exhaust to the environment. The EGR system includes an air-to-gas EGR cooler, an air supply conduit for supplying inlet air to the EGR cooler, an EGR supply conduit for communicating exhaust from the exhaust circuit to the EGR cooler, and an EGR outlet conduit communicating cooled EGR from the EGR cooler to the intake circuit. The EGR system also includes a venturi unit in the exhaust circuit, and an air outlet conduit communicating heated air from the EGR cooler to the venturi unit. Flow of exhaust through the venturi creates a pressure which draws cooling air through the EGR cooler. A valve controls flow through the outlet conduit as a function of a sensed temperature in the intake circuit.

9 Claims, 2 Drawing Sheets

EXHAUST GAS RECIRCULATION SYSTEM

BACKGROUND

The present invention relates to an exhaust gas recirculation system for an internal combustion engine.

It is known to use exhaust gas re-circulation (EGR) to reduce engine exhaust emissions. The exhaust gas that is to be re-circulated must be cooled to keep intake manifold temperatures low. Currently, the heat is removed from the EGR loop and absorbed in the water/glycol circuit that cools the engine. This works, but it is not an efficient method of removing heat because the hot exhaust gas transfers its heat to cooler liquid which then transfers its heat to the ambient air. Since heat transfer is driven by a difference between the two mediums, it is always best to keep this difference as large as possible.

In a low-pressure loop exhaust gas recirculation (EGR) system, the exhaust is removed downstream of the turbine, and re-inserted after the air cleaner and before the compressor. The combined combustion air and exhaust gas is then compressed and sent to the charge air cooler where it is cooled prior to entering the intake manifold of the engine.

During cool weather, water may condense out of the combined charge air. This condensed water is very corrosive because the exhaust gas contains both sulphuric and nitric acids. The corrosive condensate will damage the charge air cooler which is usually made of copper alloy or aluminum for efficiency reasons. An EGR system which reduces or eliminates such corrosive condensation is desired.

U.S. Pat. No. 6,216,458 shows an EGR system with a gas to air EGR cooler and a valve in an air line between the EGR cooler and exhaust gas outlet. However, this patent describes embodiments which require pressurized cooling air from the intake air compressor, and a mass air flow sensor. In one embodiment fresh ambient air is communicated to the EGR cooler, but the fresh air to be transported to the EGR cooler is "ram air" or air which is drawn through the radiator with a fan as the vehicle travels at a given speed. This embodiment includes both a temperature sensor and a pressure responsive EGR valve.

SUMMARY

Accordingly, an object of this invention is to provide an engine EGR system which includes air cooled EGR and which prevents corrosive condensation.

A further object of the invention is to provide such a system which does not require a positively pressurized source of air for the EGR cooler.

A further object of the invention is to provide such a system which does not require a mass flow sensor or a pressure responsive EGR valve. These and other objects are achieved by the present invention, wherein an exhaust gas recirculation (EGR) system is provided for an internal combustion engine having a combustion air intake circuit, an exhaust manifold, and an exhaust circuit for communicating engine exhaust to the environment. The EGR system includes an air-to-gas EGR cooler, an air supply conduit for supplying inlet air to the EGR cooler, an EGR supply conduit for communicating exhaust from the exhaust circuit to the EGR cooler, and an EGR outlet conduit communicating cooled EGR from the EGR cooler to the intake circuit. The EGR system also includes a venturi unit in the exhaust circuit, and an air outlet conduit communicating heated air from the EGR cooler to the venturi unit. Flow of exhaust through the venturi creates a pressure which draws cooling air through the EGR cooler. The flow of cooling air through the EGR cooler is controlled by a valve with controls air flow to the venturi from an alternate source, as a function of a sensed temperature in the intake circuit.

DETAILED DESCRIPTION

Figure 1:
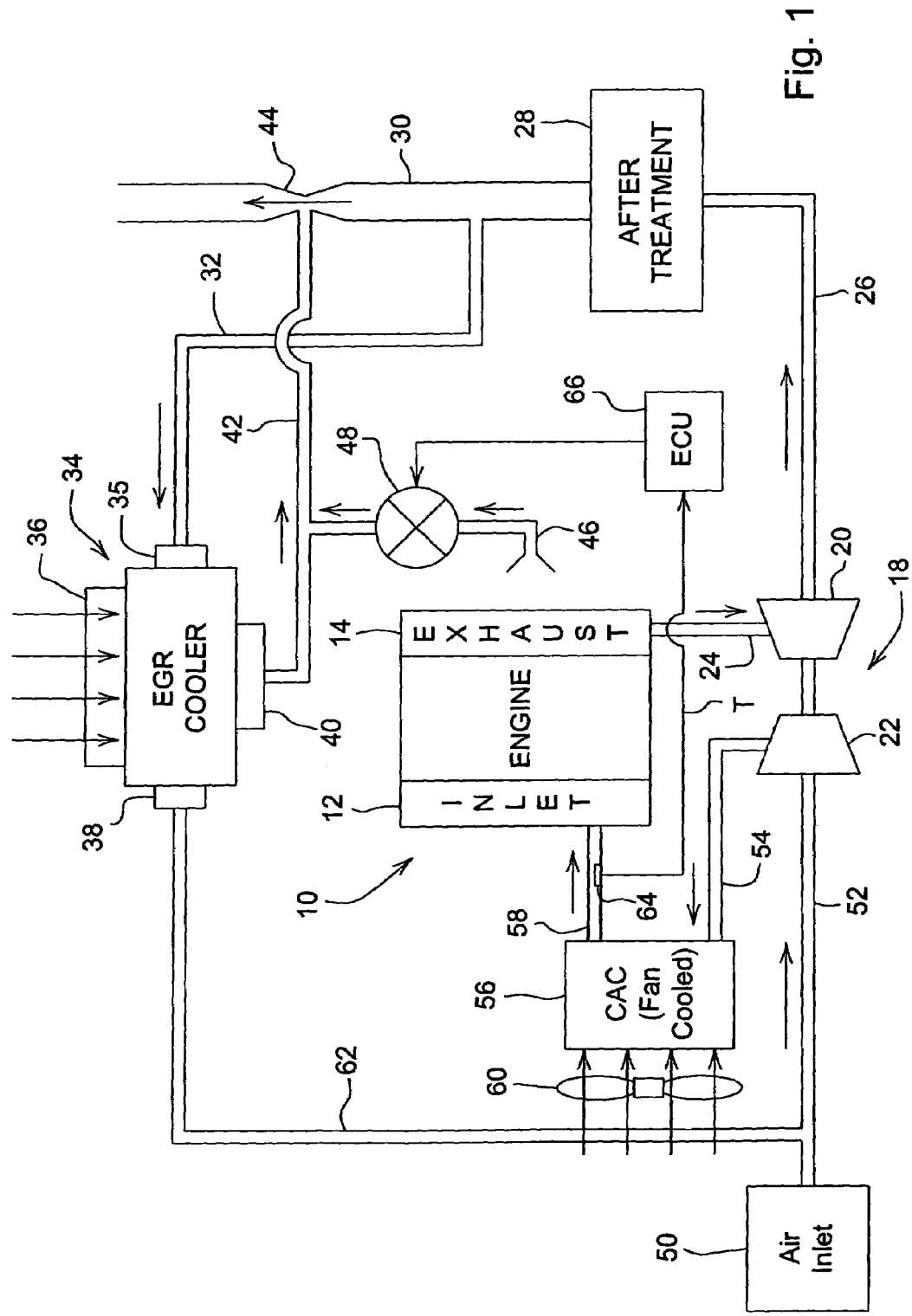
FIG. 1 is a simplified schematic diagram of an EGR system according to the present invention.

Referring to FIG. 1, an engine 10 includes a combustion air intake 12, an exhaust outlet 14 and a conventional turbo-compressor 18 which includes a turbine 20 and a compressor 22. An exhaust circuit includes an exhaust line 24 communicates engine exhaust from exhaust outlet 14 to the turbine 20. Exhaust line 26 communicates exhaust from turbine 20 to an exhaust after-treatment unit 28 (such as a particulate filter, a urea selective catalytic reducer, a lean NOx trap and/or a diesel oxidation catalyst). Exhaust outlet line 30 communicates exhaust from after-treatment unit 28 to the environment. An EGR line 32 communicates a portion of the exhaust from exhaust line 30 downstream of turbine 20 to an inlet 35 of EGR cooler 34. EGR cooler 34 includes an ambient air inlet 36, a cooled EGR outlet 38 and a heated air outlet 40. An air line 42 communicates heated air from outlet 40 to a venturi port 44 in the exhaust line 30 downstream of the after-treatment unit 28. As a result of the flow of exhaust gas through exhaust line 30, venturi port 44 creates a suction or negative pressure which draws cooling air through cooler 34 and line 42. A bypass line 46 communicates ambient air to line 42. Preferably, an electronically controlled valve 48 is installed in the bypass line 46 to control the flow therethrough. Valve 48 may be an on/off or a proportional valve.

An air inlet 50 receives air from the environment. Air intake line 52 communicates a mixture of intake air from air inlet 50 and cooled exhaust gas from EGR cooler 34 to the compressor 22. Line 54 communicates the compressed mixture from compressor 22 to an inlet of a charge air cooler 56. Intake line 58 communicates cooled charge air from charge air cooler 56 to the engine intake 12. A fan 60 blows cooling air into the charge air cooler 56. A cooled EGR line 62 communicates cooled EGR from outlet 38 of EGR cooler 34 to a port in intake line 52 upstream of compressor 22.

A parameter sensor, preferably a temperature type sensor 64 senses the temperature of the mixture in line 58 and supplies an electronic temperature signal T to an electronic control unit ECU 66. The ECU 66 controls valve 46 in response to the sensed temperature. Preferably, ECU 66 is programmed to cause valve 46 to fully or partially open if the sensed temperature approaches or falls below the dew point temperature. This reduces the flow of cooling air through cooler 34, increases the EGR temperature which flows out of cooler 34, and thus increases the temperature of the mixture in lines 54 and 58 and maintains the mixture temperature above the temperature at which condensation occurs.

With this system, the control valve regulates the flow of cooling air through the EGR cooler as a function of the temperature of the air/EGR mixture exiting the compressor. If this temperature approaches the dew point temperature, the flow is reduced which allows hotter exhaust gas to be combined with the charge air, thereby ensuring that the mixed temperature remains above the point at which condensation occurs.

This system transfers heat directly to the ambient air. This is the most efficient way of removing the heat because it maintains the largest temperature difference possible. This system is also self-regulating. When the engine runs faster, more exhaust gas is created, the EGR flow increases, the entrained air flow rises and the amount of cooling increases. Also, the heat being removed is directed up and away from the tractor by the exhaust circuit, thereby reducing the risk of re-circulating the air into the cooling or combustion air systems. If necessary, a valve could be placed in line 32 to control the flow of EGR therethrough.

Figure 2:
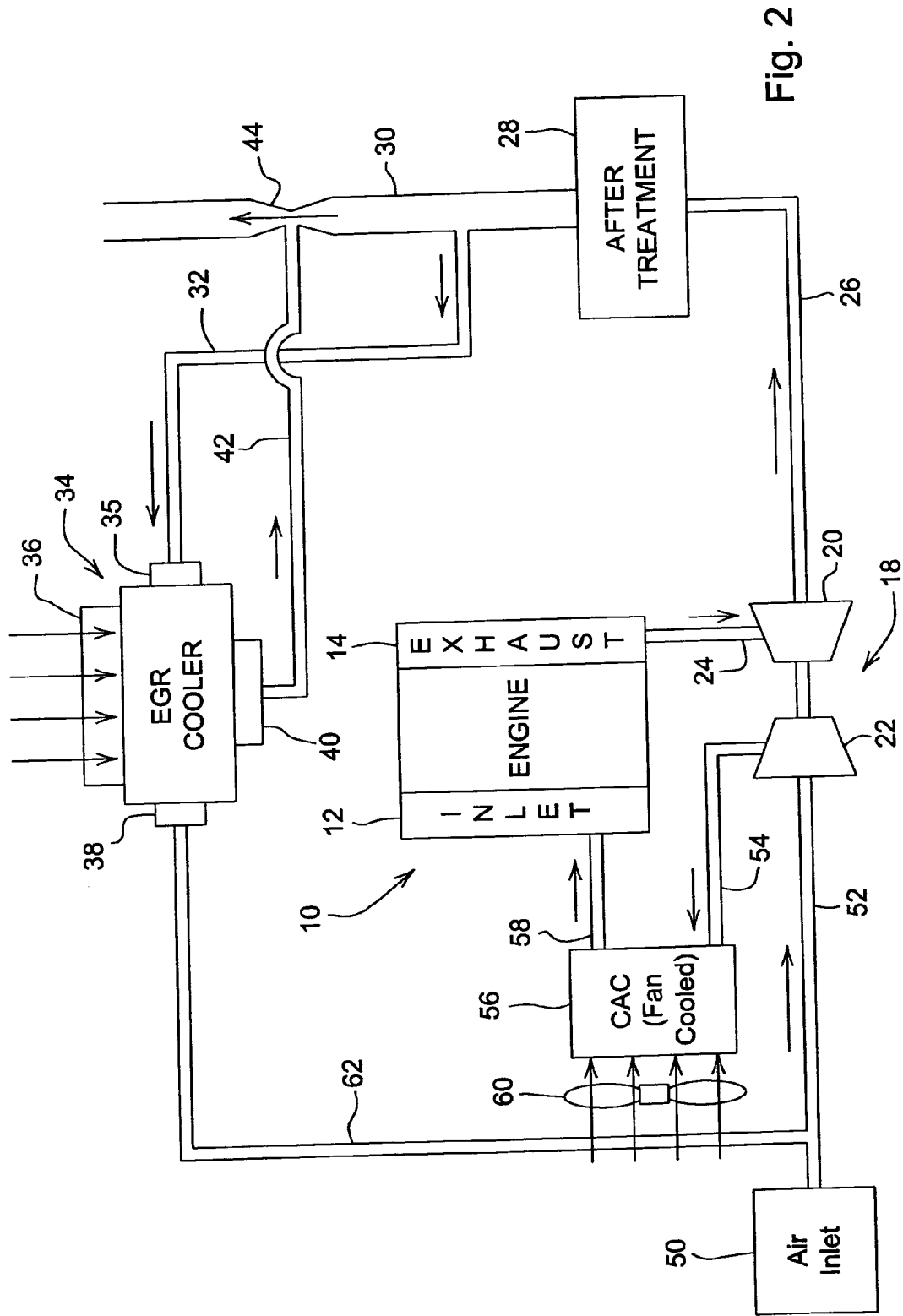
FIG. 2 is a simplified schematic diagram of a simplified alternate EGR system according to the present invention.

Referring now to FIG. 2, there is shown a simpler alternate embodiment similar to FIG. 1, but wherein the bypass inlet 46, valve 48, sensor 64 and ECU 66 are eliminated. In the system of FIG. 2 increasing exhaust flow through line 30 increases the suction at venturi 44. This increases the flow of cooling air through line 42 and increase the cooling effect upon EGR cooler 34. Conversely, decreasing exhaust flow decreases the flow of cooling air though line 42 and decreases the cooling effect upon EGR cooler 34.

While the present invention has been described in conjunction with a specific embodiment, it is understood that many alternatives, modifications and variations will be apparent to those skilled in the art in light of the foregoing description. Accordingly, this invention is intended to embrace all such alternatives., modifications and variations which fall within the spirit and scope of the appended claims.

We claim:

1. An exhaust gas recirculation (EGR) system for an internal combustion engine having a combustion air intake circuit, an exhaust manifold, a turbocharger unit having an exhaust turbine and an inlet air compressor, and an exhaust circuit for communicating engine exhaust to the environment, the EGR system comprising:
an air-to-gas EGR cooler;
an air supply conduit for supplying inlet air to the EGR cooler;
an EGR supply conduit for communicating exhaust from the exhaust circuit to the EGR cooler;
an EGR outlet conduit communicating cooled EGR from the EGR cooler to the intake circuit upstream of the compressor;
a venturi unit in the exhaust circuit; and
an air outlet conduit communicating heated air from the EGR cooler to the venturi unit, flow of exhaust through the exhaust line and the venturi creating a pressure which draws cooling air through the EGR cooler.

2. The EGR system of claim 1, further comprising:
a bypass line communicating ambient air to the air outlet conduit; and
a bypass valve controlling flow through the bypass line.

3. The EGR system of claim 2, further comprising:
a parameter sensor in the intake circuit; and
a control unit for controlling the bypass valve as a function of the sensed parameter.

4. The EGR system of claim 3, wherein:
the parameter sensor comprises a temperature sensor.

5. The EGR system of claim 2, further comprising:
a compressor outlet line communicating a mixture of air and exhaust from the compressor to the combustion air intake;
a temperature sensor in the compressor outlet line; and
a control unit for controlling the bypass valve as a function of the temperature sensed by the sensor.

6. The EGR system of claim 2, further comprising:
charge air cooler;
a temperature sensor in the EGR conduit; and
a control unit for controlling the bypass valve as a function of the temperature sensed by the temperature sensor.

7. The EGR system of claim 6, wherein:
the temperature sensor is upstream of the charge air cooler.

8. An exhaust gas recirculation (EGR) system for an internal combustion engine having a combustion air intake circuit, an exhaust manifold, and an exhaust circuit for communicating engine exhaust to the environment, the EGR system comprising:
an air-to-gas EGR cooler;
an air supply conduit for supplying inlet air to the EGR cooler;
an EGR supply conduit for communicating exhaust from the exhaust circuit to the EGR cooler;
an EGR outlet conduit communicating cooled EGR from the EGR cooler to the intake circuit;
a venturi unit in the exhaust circuit;
an air outlet conduit communicating heated air from the EGR cooler to the venturi unit, flow of exhaust through the venturi creating a pressure which draws cooling air through the EGR cooler;
a bypass line communicating ambient air to the air outlet conduit;
a bypass valve controlling flow through the bypass line;
a parameter sensor in the intake circuit;
a control unit for controlling the bypass valve as a function of the sensed parameter; and
a turbocharger unit having an exhaust turbine and an inlet air compressor, the EGR outlet conduit communicating cooled EGR from the EGR cooler to the intake circuit upstream of the compressor.

9. An exhaust gas recirculation (EGR) system for an internal combustion engine having a combustion air intake circuit, an exhaust manifold, and an exhaust circuit for communicating engine exhaust to the environment, the EGR system comprising:
an air-to-gas EGR cooler;
an air supply conduit for supplying inlet air to the EGR cooler;
an EGR supply conduit for communicating exhaust from the exhaust circuit to the EGR cooler;
an EGR outlet conduit communicating cooled EGR from the EGR cooler to the intake circuit;
a venturi unit in the exhaust circuit;
an air outlet conduit communicating heated air from the EGR cooler to the venturi unit, flow of exhaust through the venturi creating a pressure which draws cooling air through the EGR cooler;
a bypass line communicating ambient air to the air outlet conduit;
a bypass valve controlling flow through the bypass line;
a parameter sensor in the intake circuit; and
a control unit for controlling the bypass valve as a function of the sensed parameter, the engine including a turbocharger unit having an exhaust turbine and an inlet air compressor, and the EGR supply conduit communicating with the exhaust circuit downstream of the turbine.

* * * * *